United States Patent [19]

Goldman

[11] Patent Number: 4,921,606
[45] Date of Patent: May 1, 1990

[54] SEAMLESS FILTER BAGS WITH A REMOVABLE, REFUSABLE RING

[75] Inventor: Sidney Goldman, Coral Springs, Fla.

[73] Assignee: Mechanical Manufacturing Corporation, Sunrise, Fla.

[21] Appl. No.: 386,192

[22] Filed: Jun. 30, 1989

[51] Int. Cl.$^5$ ........................ B01D 23/06; B01D 29/10
[52] U.S. Cl. .................................. 210/238; 210/448; 210/452; 210/470; 55/363; 55/378; 55/381; 29/163.8
[58] Field of Search ............... 210/232, 237, 238, 448, 210/452, 470; 55/361, 363, 378, 381; 29/163.8

[56] References Cited

U.S. PATENT DOCUMENTS

| | | | |
|---|---|---|---|
| 2,205,706 | 10/1937 | Wolff | 210/161 |
| 2,890,796 | 6/1959 | Blood | 210/470 |
| 3,204,392 | 9/1965 | Schwab | 210/448 |
| 4,157,964 | 6/1979 | Rishel | 210/452 |
| 4,268,390 | 5/1981 | Cunningham | 210/448 |
| 4,490,253 | 12/1984 | Tafara | 210/238 |
| 4,495,072 | 1/1985 | Fields | 210/448 |
| 4,545,833 | 10/1985 | Tafara | 210/348 |
| 4,669,167 | 6/1987 | Asterlin | 210/232 |
| 4,775,469 | 10/1988 | Zimmerly | 210/237 |

Primary Examiner—W. Gary Jones
Assistant Examiner—Wanda L. Millard
Attorney, Agent, or Firm—Sachs & Sachs

[57] ABSTRACT

A seamless filter bag having a removable, reusable ring includes a heat sealed filter bag open on one end adapted to receive a removable ring therein. Openings are provided in the filter bag which receive inwardly extending protrusions on the ring thereby maintaining the integrity of the filter bag material. A handle adapted to be received by the inwardly extending protrusions on the filter ring permits the removal of the filter bag together with the ring and any material retained in the bag from a conventional filter basket.

7 Claims, 1 Drawing Sheet

SEAMLESS FILTER BAGS WITH A REMOVABLE, REUSABLE RING

BACKGROUND OF THE INVENTION

1. Field of the Invention

The present invention relates to filter bags, and more particularly, to a seamless filter bag having a removable, reusable ring which maintains the filtering integrity of the filter bag material.

2. Discussion of the Relevant Art

In chemical or paint spraying systems where there is a requirement for filtering the sprayed material, which is under relatively high pressure, there have been numerous attempts to maintain the integrity of the filtering system. Typically, the filter apparatus includes a rigid housing into which is placed a filter basket. The filter basket houses a filter bag which determines the degree of filtering to be afforded to the material passing therethrough. A cover is then applied to the housing locking the filter material and filter basket therein. The system typically has the material to be filtered entering, via the cover or upper portion of the housing, and the filtered material exiting somewhere below the filter basket or alternatively, via an orifice disposed somewhere along the length of the filter housing.

Over the years many different schemes have been devised to provide the desired filtering, but the problem of maintaining the integrity of the filter material exists wherein the seam of the filter bag, in the older known types destroy the filter material integrity, since stitching was utilize to provide the seams for the filter bag, or alternatively, it would be used for affixing a ring member to the filter bag to enable a filter bag to stay fully opened when it was placed in a filter basket. Improvement in the filter material was accomplished over the years and the technique of heat sealing or heat welding solved the problem of maintaining the integrity of the filter material along the side edges and along the bottom portion of the filter bag, however, there still remained the problem of affixing a filter ring to the filter bag without using a sewing technique, which allows the material being filtered to seep through the needle holes, thereby destroying the filter material integrity.

Numerous attempts were made to overcome the problem of stitching the bottom and sides of the filter bag material while maintaining the filter bag integrity. Typical of these are disclosed in U.S. Pat. No. 4,545,833 issued to Peter T. Tafara on Oct. 5, 1985. Another technique to overcome the use of stitching to maintain a relatively stiff or a hard ring on the filter bag is disclosed in U.S. Pat. No. 4,490,253 to Tafara issued on Dec. 25, 1984 which permitted the reusability of the hardened filter rings, however, this caused some difficulty in removing the filter rings from filter bag once the filter bag had been filled with debris.

The present invention overcomes all the shortcomings known in the prior art by providing a simple seamless filter bag which may be readily placed over a removable, reusable ring of rigid material that is ideally suited for insertion into a filter basket and maintains the integrity of the filter material. A handle is provided for ease in removing the filter bag and ring assembly when full so that the filter bag may be readily replaced upon the filter ring and then returned to the filter basket.

SUMMARY OF THE INVENTION

Therefore, it is an object of the present invention to provide a seamless filter bag assembly with a removable, reusable ring that is capable of maintaining the filter material integrity.

It is another object of the present invention to provide a simplified filter bag assembly that permits the user thereof to readily replace filter bags without contaminating the rest of the system when removing the filter bag.

It is another object of the present invention to provide an inexpensive, reliable filter bag system for use in high pressure systems.

A seamless filter bag having a removable, reusable ring, according to the principles of the present invention comprises, in combination a filter bag having a heat sealed closed end and at least one heat sealed side edge and an open end. The open end is provided with a plurality of notches or cut-outs. A plurality of openings are disposed about the circumference between the notches and are proximate the open end. A removable filter ring is provided with a plurality of inwardly extending protrusions that are adapted to be received into the openings of the filter bag. The diameter of the ring is selected to maintain the filter bag open end fully extended to an open position.

The filter bag is also provided with an elongated handle which is adapted to extend from one inwardly extending protrusion to another diametrically opposed protrusion and its ends provided with a partial loop or hook adapted to be received into apertures provided in the diametrically opposed inwardly extending protrusions wherein the handle is adapted to remove the filter ring together with the filter bag from a filter basket without spilling any of the debris retained by the filter bag.

The foregoing and other objects and advantages will appear from the description to follow. In the description reference is made to the accompanying drawing which forms a part hereof, and in which is shown by way of illustration a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawing in which.

DESCRIPTION OF THE PREFERRED EMBODIMENT

Figure 1:
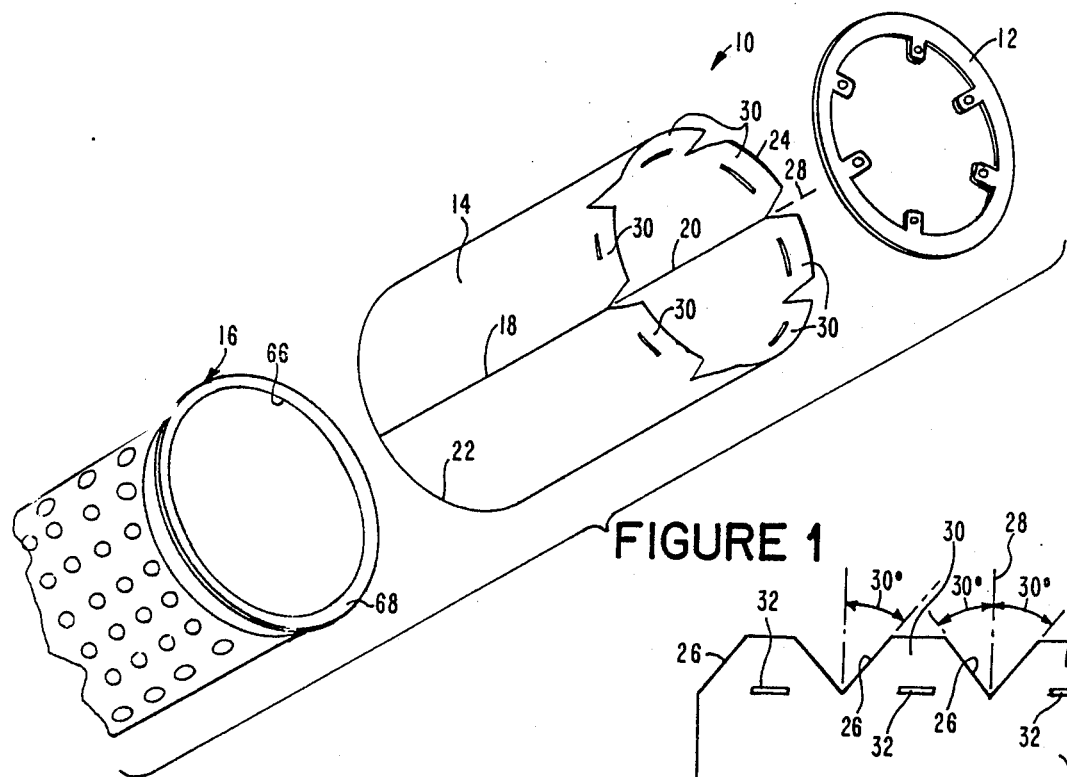
FIG. 1 is an exploded perspective view of a seamless filter bag with a removable, reusable ring, according to the principles of the present invention, adapted to be inserted into a filter basket.

Referring now to the Figures, and in particular to FIG. 1, there is shown a filter bag and removable ring assembly 10 which includes a removable, reusable ring 12 and a filter bag 14 suitable for use in a pressurized filter system and is typically installed in a filter basket 16. The filter bag 14 may be fabricated from any number or types of filter material such as that known as synthetic fibers e.g., polyester, polypropylene, fiberglass, polyamide or fluorocarbon, with the filter bag longitudinal edges 18 and 20 and the bottom edge 22 sealed as set forth in the above referenced patents, thereby maintaining the integrity or micron rating of the filter material chosen for the particular application.

Figure 2:
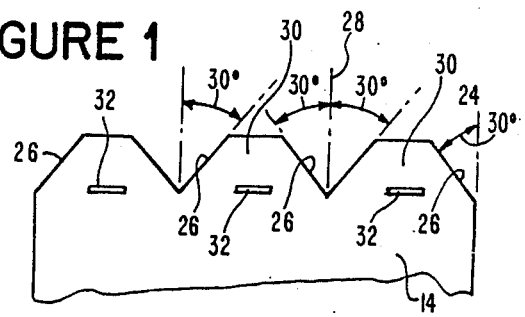
FIG. 2 is a partial view in elevation of the open end of the filter bag shown in FIG. 1.

Referring now to FIG. 2 which is a partial view in elevation of the open end 24 of filter bag 14. There is provided a notch or cut-out 26, such that when referred to the longitudinal axis 28 of the filter bag is cut to 30 degrees therefrom, providing for an included angle of 2 times 30 degrees or 60 degrees. Six such notches are provided at the open end 24 of the filter bag 14 and when cut or formed with a heat cutting method known in the art, takes the shape as shown in FIG. 2. Preferably, only six cut-outs 26 are provided with each overhanging portion 30 have an opening or slit 32 provided therein. The purpose and function of slit 32 will be described hereinafter.

Figure 3:
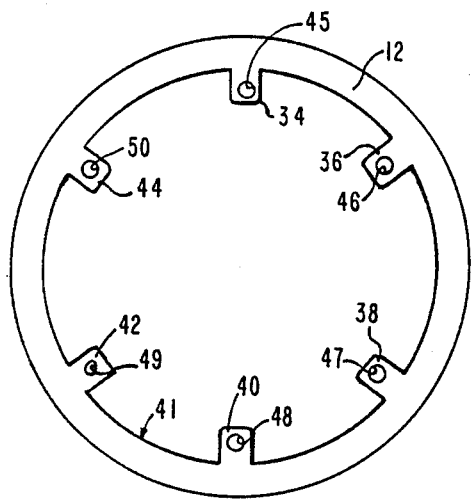
FIG. 3 is a top plan view of the removable, reusable filter bag ring.

Referring now to FIG. 3, the filter ring 12 of the instant invention shown therein in a top or plan view, includes six inwardly protruding portions 34, 36, 38, 40, 42 and 44 which are preferably equally spaced about the inner circumference 42 of the ring 12. Each of the inwardly protruding portions 34, 36, 38, 40, 42 and 44 are provided with apertures 45, 46, 47, 48 and 50 proximate the distal edge of the protruding portions 34, 36, 38, 40, 42 and 44, respectively. The diameter of the apertures 45, 46, 47, 48, 49 and 50 is selected to receive the hooked ends 52 of a handle member 54.

Figure 4:
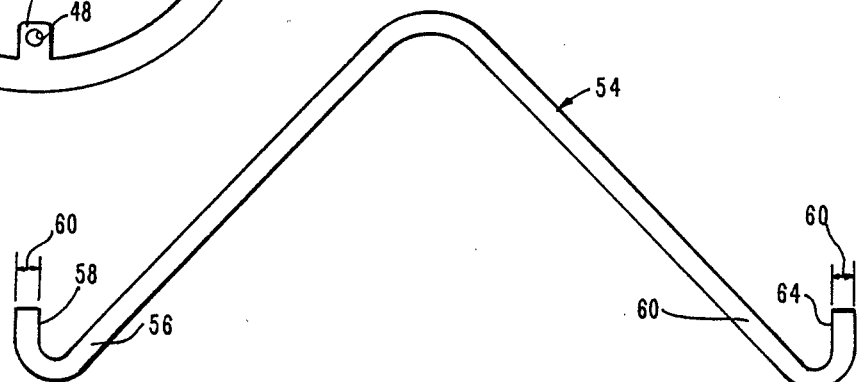
FIG. 4 is a side view in elevation of a handle suitable for removing the filter bag and ring assembly from a filter basket.

Referring now to FIG. 4, there is shown the handle member 54 preferably made of a relatively large gauge wire or a rod having a ⅛ inch diameter (3.175 mm). The handle 54 is designed to extend from one inwardly extending portion 34 to a diametrically opposed inwardly extending portion 48 on the filter ring 12. One end 56 is provided with a hook or loop 58 having a diameter 60 adapted to be received into the aperture 45 provided on inwardly protruding portion 34 of ring member 12. The other end 60 of handle 54 is provided with a hook or loop 64 having the same diameter 60 as provided on the end 56.

In operation, the seamless filter bag 14 is fully opened and will be held in that position by the filter ring member 12. The overhanging portions 30 are draped over each of the inwardly extending portions of ring member 12 so that the slits 30 are placed over the inwardly extending portions and removedly affixed thereon, thereby retaining the filter bag 14 in position. The filter bag and ring assembly 10 is then inserted into the filter basket 16, in a conventional manner, with the ring member 12 seated on a lip 66 provided on the open end 68 of the filter basket 16. The filter housing into which the filter basket 16 is inserted, is well known in the art, and is not shown herein. Once the system has been in operation for a while and the filter bag 14 is filled with debris the filter housing, not shown, is opened and the filter bag and ring assembly may be removed with the aid of the handle 54. The end 56 of the handle 54, having the hook or loop 58 thereon, is placed within an aperture 45 provided in an inwardly protruding member 34 and the other end 60 having hook or loop 64 therein is placed into aperture 48 provided on inwardly protruding portion 48 whereby an individual may readily remove the ring member 12 of filter basket by lifting it in an upwardly direction taking out the filter bag and ring without having any of the debris fall back into the housing.

Hereinbefore has been disclosed a reliable simple assembly for a seamless filter bag having a removable, reusable ring and a removable handle assembly which may be utilized in high pressure filter systems. It will be understood that various changes in the details, materials, arrangements of parts and operating conditions which have been herein described and illustrated in order to explain the nature of the invention may be made by those skilled in the art within the principles and scope of the instant invention.

Having thus set forth the nature of the invention what is claimed is:

1. A seamless filter bag having a removable, reusable ring comprises, in combination:
   (a) a filter bag having;
      (i) heat sealed closed end;
      (ii) at least one heat sealed side edge;
      (iii) an open end, said open end being provided with a plurality of notches, and
      (iv) a plurality of openings, each one of said openings being disposed about the circumference between said notches proximate said open end; and
   (b) removable filter ring means, said ring means having a plurality of inwardly extending protrusions each one of said protrusion being adapted to be received into one of said openings, the diameter of said ring means being selected to maintain said filter bag open end fully opened.

2. A filter bag according to claim 1 wherein said filter bag open end is provided with six notches.

3. A filter bag according to claim 2 wherein each of said notches is provided with an included angle of approximately 60 degrees.

4. A filter bag according to claim 1 wherein each one of said openings is a slit.

5. A filter bag according to claim 1 wherein said ring means is flat and said inwardly extending protrusions are each provided with an aperture proximate its distal end.

6. A filter bag according to claim 1 further including elongated handle means, said handle means being adapted to extend from one inwardly extending protrusion to another diametrically opposed inwardly extending protrusion, and having;
   (a) one end provided with a loop or hook, said loop or hook being adapted to be received into one of said apertures provided on said inwardly extending protrusions, and,
   (b) the other end is provided with a loop or hook adapted to be received into an aperture provided on said diametrically opposed inwardly extending protrusion;
   wherein said handle means may remove said filter ring means with said filter bag disposed thereon from a filter basket without spilling the debris retained by said filter bag.

7. A filter bag according to claim 6 wherein said handle means is fabricated from relatively heavy gauge wire or rod material.

* * * * *

UNITED STATES PATENT AND TRADEMARK OFFICE
CERTIFICATE OF CORRECTION

PATENT NO. : 4,921,606

DATED : May 1, 1990

INVENTOR(S) : Sidney Goldman

It is certified that error appears in the above-identified patent and that said Letters Patent is hereby corrected as shown below:

Title of the Invention:

Delete "Refusable" and insert therefor --Reusable--.

Column 1, line 2; delete "Refusable" and insert therefor --Reusable--.

Signed and Sealed this

Sixteenth Day of April, 1991

Attest:

HARRY F. MANBECK, JR.

Attesting Officer

Commissioner of Patents and Trademarks